US012609801B2

(12) United States Patent
Lei

(10) Patent No.: US 12,609,801 B2
(45) Date of Patent: Apr. 21, 2026

(54) METHOD AND APPARATUS FOR HARQ-ACK FEEDBACK TRANSMISSION

(71) Applicant: Lenovo (Beijing) Limited, Beijing (CN)

(72) Inventor: Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 324 days.

(21) Appl. No.: 18/278,110

(22) PCT Filed: Mar. 11, 2021

(86) PCT No.: PCT/CN2021/080213
§ 371 (c)(1),
(2) Date: Aug. 21, 2023

(87) PCT Pub. No.: WO2022/188095
PCT Pub. Date: Sep. 15, 2022

(65) Prior Publication Data
US 2024/0137183 A1     Apr. 25, 2024
US 2024/0235791 A9     Jul. 11, 2024

(51) Int. Cl.
*H04L 5/00*          (2006.01)
*H04L 1/1829*        (2023.01)
(Continued)

(52) U.S. Cl.
CPC .......... *H04L 5/0055* (2013.01); *H04L 1/1861*
(2013.01); *H04L 1/1896* (2013.01); *H04W*
*72/232* (2023.01)

(58) Field of Classification Search
CPC ... H04L 5/0055; H04L 1/1861; H04L 1/1896;
H04L 1/1854; H04L 2001/0093;
(Continued)

(56) References Cited

U.S. PATENT DOCUMENTS

2011/0231550 A1*   9/2011   Murray .................. G06F 9/526
709/226
2014/0146738 A1*   5/2014   Morioka ............... H04L 1/1861
370/312
(Continued)

FOREIGN PATENT DOCUMENTS

CN          111130735 A      5/2020

OTHER PUBLICATIONS

CATT , "Discussion on reliability improvement mechanism for RRC_CONNECTED UEs in MBS", 3GPP TSG RAN WG1 #104-e, R1-2100355, e-Meeting [retrieved Aug. 8, 2023]. Retrieved from the Internet <https://www.3gpp.org/ftp/TSG_RAN/WG1_RL1/TSGR1_104-e/Docs/?sortby=size>., Feb. 2020, 12 Pages.
(Continued)

*Primary Examiner* — Mang Hang Yeung
(74) *Attorney, Agent, or Firm* — FIG. 1 Patents

(57)          ABSTRACT

Embodiments of the present disclosure relate to hybrid automatic repeat request acknowledgement (HARQ-ACK) feedback transmission. According to some embodiments of the disclosure, a method may include: receiving, from a base station (BS), configuration information for a sub-group of UEs, wherein the sub-group of UEs comprises the UE; receiving, from the BS, a downlink control information (DCI) format for scheduling a physical downlink shared channel (PDSCH), wherein the PDSCH is received by a plurality of UEs which are divided into a plurality of sub-groups of UEs comprising the sub-group of UEs; determining a time domain resource for transmitting HARQ-ACK feedback for the PDSCH; and transmitting, to the BS, the HARQ-ACK feedback for the PDSCH on the time domain resource.

19 Claims, 7 Drawing Sheets

(51) Int. Cl.
H04L 1/1867 (2023.01)
H04W 72/232 (2023.01)

(58) Field of Classification Search
CPC .. H04L 5/0044; H04L 5/0094; H04W 72/232; H04W 72/23; H04W 72/121
USPC .......................................................... 370/329
See application file for complete search history.

(56) References Cited

U.S. PATENT DOCUMENTS

| | | | |
|---|---|---|---|
| 2019/0261310 A1* | 8/2019 | Martin .............. | H04W 72/0446 |
| 2020/0374048 A1 | 11/2020 | Lei et al. | |
| 2022/0183032 A1* | 6/2022 | Papasakellariou .... | H04L 1/1861 |
| 2024/0137908 A1* | 4/2024 | Agiwal ................ | H04W 68/02 |

OTHER PUBLICATIONS

Futurewei , "Discussion on improving reliability for RRC_CONNECTED UEs", 3GPP TSG RAN WG1 #104-e, R1-2100049, e-Meeting [retrieved Aug. 8, 2023]. Retrieved from the Internet <https://www.3gpp.org/ftp/TSG_RAN/WG1_RL1/TSGR1_104-e/Docs/>., Feb. 2021, 6 Pages.

Huawei , et al., "Mechanisms to improve reliability for RRC_CONNECTED UEs", 3GPP TSG RAN WG1 Meeting #104-e, R1-2100190, E-meeting [retrieved Aug. 8, 2023]. Retrieved from the Internet <https://www.3gpp.org/ftp/tsg_ran/WG1_RL1/TSGR1_104-e/Docs>., Feb. 2021, 6 Pages.

Lenovo , "Discussion on reliability improvement for RRC-CONNECTED UEs", 3GPP TSG RAN WG1 #104-e, R1-2100769, E-meeting [retrieved Aug. 8, 2023]. Retrieved from the Internet <https://www.3gpp.org/ftp/TSG_RAN/WG1_RL1/TSGR1_104-e/Docs/>., Feb. 2021, 6 Pages.

OPPO , "UL feedback for RRC-CONNECTED UEs in MBMS", 3GPP TSG RAN WG1 #104-e, R1-2100145, e-Meeting [retrieved Aug. 8, 2023]. Retrieved from the Internet <https://www.3gpp.org/ftp/tsg_ran/WG1_RL1/TSGR1_104-e/Docs>., Feb. 2021, 6 Pages.

PCT/CN2021/080213 , "International Preliminary Report on Patentability", PCT Application No. PCT/CN2021/080213, Sep. 21, 2023, 6 pages.

PCT/CN2021/080213 , "International Search Report and Written Opinion", PCT Application No. PCT/CN2021/080213, Nov. 25, 2021, 8 pages.

ZTE , "Discussion on mechanisms to Improve Reliability for RRC_CONNECTED UEs", 3GPP TSG RAN WG1 #104-e, R1-2100107, e-Meeting [retrieved Aug. 8, 2023]. Retrieved from the Internet <https://www.3gpp.org/ftp/TSG_RAN/ WG1_RL1/ TSGR1_104-e/Docs/>., Feb. 2021, 11 Pages.

* cited by examiner

300

500 receiving, from a BS, configuration information for a sub-group of UEs — 511 receiving, from a BS, a DCI format for scheduling a PDSCH — 513 determining a time domain resource for transmitting HARQ-ACK feedback for the PDSCH — 515 transmitting, to the BS, the HARQ-ACK feedback for the PDSCH on the time domain resource — 517

600 transmitting, to a sub-group of UEs, configuration information — 611 transmitting, to a plurality of UEs, a DCI format for scheduling a PDSCH — 613 receiving, from the UEs in the sub-group of UEs, HARQ-ACK feedback for the PDSCH on a time domain resource — 615

METHOD AND APPARATUS FOR HARQ-ACK FEEDBACK TRANSMISSION

TECHNICAL FIELD

Embodiments of the present disclosure generally relate to wireless communication technology, and more particularly to hybrid automatic repeat request acknowledgement (HARQ-ACK) feedback transmission.

BACKGROUND

Wireless communication systems are widely deployed to provide various telecommunication services, such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems, such as long term evolution (LTE) systems, LTE-advanced (LTE-A) systems, or LTE-A Pro systems, and fifth generation (5G) systems which may also be referred to as new radio (NR) systems.

A wireless communication system may support multicast and broadcast services (MBSs). One or more user equipment (UE) may be grouped as an MBS group and may receive multicast transmissions from a base station (BS) via a physical downlink shared channel (PDSCH). The one or more UEs may transmit hybrid automatic repeat request acknowledgement (HARQ-ACK) feedback corresponding to the PDSCH transmission through a physical uplink control channel (PUCCH) or a physical uplink shared channel (PUSCH).

There is a need for handling HARQ-ACK feedback for multicast transmissions in a wireless communication system.

SUMMARY

Some embodiments of the present disclosure provide a method for wireless communication performed by a user equipment (UE). The method may include: receiving, from a base station (BS), configuration information for a sub-group of UEs, wherein the sub-group of UEs comprises the UE; receiving, from the BS, a downlink control information (DCI) format for scheduling a physical downlink shared channel (PDSCH), wherein the PDSCH is received by a plurality of UEs which are divided into a plurality of sub-groups of UEs comprising the sub-group of UEs; determining a time domain resource for transmitting hybrid automatic repeat request acknowledgement (HARQ-ACK) feedback for the PDSCH; and transmitting, to the BS, the HARQ-ACK feedback for the PDSCH on the time domain resource.

Some embodiments of the present disclosure provide a method for wireless communication performed by a base station (BS). The method may include: transmitting, to a sub-group of user equipment (UE), configuration information; transmitting, to a plurality of UEs, a downlink control information (DCI) format for scheduling a physical downlink shared channel (PDSCH), wherein the plurality of UEs are divided into a plurality of sub-groups of UEs comprising the sub-group of UEs; and receiving, from the UEs in the sub-group of UEs, hybrid automatic repeat request acknowledgement (HARQ-ACK) feedback for the PDSCH on a time domain resource.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principles of the present disclosure.

Figure 1:
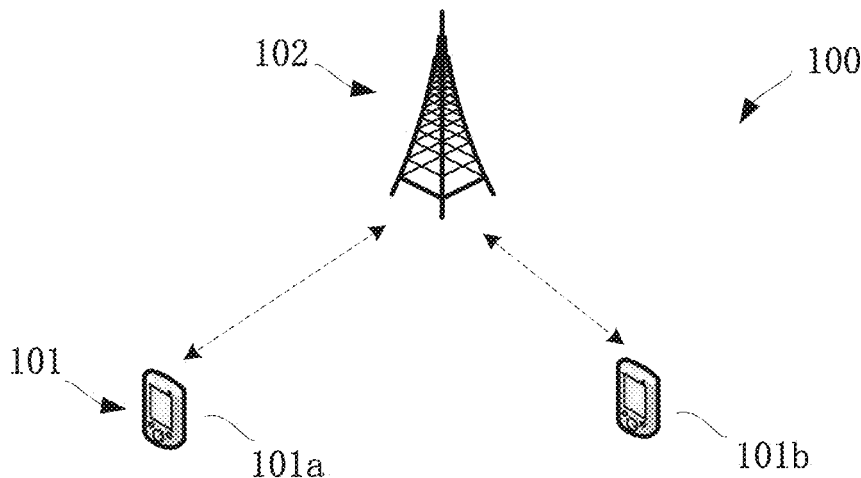
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, a wireless communication system 100 may include some UEs 101 (e.g., UE 101a and UE 101b) and a base station (e.g., BS 102). Although a specific number of UEs 101 and BS 102 are depicted in FIG. 1, it is contemplated that any number of UEs and BSs may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present disclosure, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate with the BS 102 via uplink (UL) communication signals.

The BS 102 may be distributed over a geographic region. In certain embodiments of the present disclosure, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally a part of a radio access network that may include one or more controllers communicably coupled to one or more corresponding BSs 102. The BS 102 may communicate with UE(s) 101 via downlink (DL) communication signals.

The wireless communication system 100 may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with 5G NR of the 3GPP protocol. For example, BS 102 may transmit data using an orthogonal frequency division multiple (OFDM) modulation scheme on the DL and the UE(s) 101 may transmit data on the UL using a discrete Fourier transform-spread-orthogonal frequency division multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present disclosure, the BS 102 and UE(s) 101 may communicate using other communication protocols, such as the IEEE 802.11 family of wireless communication protocols. Further, in some embodiments of the present disclosure, the BS 102 and UE(s) 101 may communicate over licensed spectrums, whereas in some other embodiments, the BS 102 and UE(s) 101 may communicate over unlicensed spectrums. The present disclosure is not intended to be limited to the implementation of any particular wireless communication system architecture or protocol.

In some embodiments of the present disclosure, the wireless communication system 100 may support multicast and broadcast services (MBSs). For example, one or more UEs (e.g., UE 101a and UE 101b) may be grouped as an MBS group to receive MBSs (e.g., an MBS PDSCH) from a BS (e.g., BS 102). Several transmission schemes including, but not limited to, the following three transmission schemes may be applied for multicast transmission: a point-to-point (PTP) transmission scheme, point-to-multipoint (PTM) transmission scheme 1, and PTM transmission scheme 2.

Under the PTP transmission scheme, RRC_CONNECTED UEs may use a UE-specific PDCCH with a cyclic redundancy check (CRC) scrambled by a UE-specific radio network temporary identifier (RNTI) (e.g., cell-RNTI (C-RNTI)) to schedule a UE-specific PDSCH which is scrambled by the same UE-specific RNTI.

Under PTM transmission scheme 1, RRC_CONNECTED UEs in the same MBS group may use a group-common PDCCH with a cyclic redundancy check (CRC) scrambled by a group-common radio network temporary identifier (RNTI) to schedule a group-common PDSCH which is scrambled by the same group-common RNTI. This scheme may also be referred to as a group-common PDCCH based group scheduling scheme. The group-common RNTI may be configured via RRC signaling.

Under PTM transmission scheme 2, RRC_CONNECTED UEs in the same MBS group may use a UE-specific PDCCH with a CRC scrambled by a UE-specific RNTI (e.g., cell-RNTI) to schedule a group-common PDSCH which is scrambled by a group-common RNTI. This scheme may also be referred to as a UE-specific PDCCH based group scheduling scheme.

The "group-common PDCCH/PDSCH" may mean that the PDCCH or PDSCH is transmitted in a common time and/or frequency resources, and can be identified by all the UEs in the same MBS group. The "UE-specific PDCCH/PDSCH" may mean that the PDCCH or PDSCH can only be identified by the target UE, but cannot be identified by other UEs.

A UE receiving a downlink multicast transmission may transmit HARQ-ACK feedback corresponding to the downlink multicast transmission to the BS through, for example, a physical uplink control channel (PUCCH). The HARQ-ACK feedback corresponding to downlink multicast transmission is essential for the multicast services in order to satisfy a quality of service (QoS) requirement, such as reliability. In some embodiments of the present disclosure, a group-common RNTI (e.g., group-RNTI (G-RNTI)) is introduced for an MBS so that a UE can differentiate a downlink control information (DCI) format scheduling an MBS PDSCH from a DCI format scheduling a unicast PDSCH. For example, the CRC of the DCI scheduling an MBS PDSCH may be scrambled by the G-RNTI and the scheduled group-common PDSCH carrying the MBS may also be scrambled by the G-RNTI.

Several options including, but not limited to, the following three options may be applied for HARQ-ACK feedback transmission corresponding to a PDSCH carrying multicast service: (1) Group NACK-only transmission, (2) UE-specific NACK-only transmission, and (3) UE-specific ACK/NACK transmission. The descriptions of the three options are listed below:

Option (1): Group NACK-only transmission

A UE does not transmit acknowledgement (ACK) to the BS when a PDSCH is successfully received.

The UE transmits negative ACK (NACK) to the BS when the PDSCH is not successfully received.

A group of UEs share the same resource to transmit respective NACK(s), if any.

Option (2): UE-specific NACK-only transmission

A UE does not transmit ACK to the BS when a PDSCH is successfully received.

The UE transmits NACK to the BS when the PDSCH is not successfully received.

Each UE of the group of UEs is provided with a specific PUCCH resource for the corresponding UE to transmit a respective NACK (if any) to the BS.

Option (3): UE-specific ACK/NACK transmission

A UE transmits ACK to the BS when a PDSCH is successfully received.

A UE transmits NACK to the BS when the PDSCH is not successfully received.

Each UE of the group of UEs is provided with a specific PUCCH resource for the corresponding UE to transmit a respective ACK/NACK to the BS.

Among the above three options, Option (1) can minimize PUCCH resource overhead while the BS cannot differentiate which UE of the group of UEs transmits the NACK in the shared PUCCH resource and cannot support PTP based retransmission. Option (2) can solve the above problem in Option (1) at the cost of increased PUCCH resources. Both Option (1) and Option (2) may require a relatively significant standardization effort. In addition, when a large number of UEs transmit NACKs on the shared PUCCH resource, transmit power would be high, thereby causing interference with a neighboring channel(s).

Compared to Option (1) and Option (2), Option (3) may have a relatively minor standardization effort based on existing HARQ-ACK codebook determination and the BS can differentiate an ACK or NACK from a corresponding UE at the cost of UE-specific PUCCH resource reservation. However, in the case that a large number of UEs, for example, several hundreds of UEs, receive a multicast transmissions, Option (3) would consume too many PUCCH resources when, for example, at least two specific PUCCH resources are configured for each UE for respectively transmitting an ACK and NACK corresponding to the multicast transmission. In that sense, PUCCH resources may be exhausted especially when significant PUCCH resources may also be required for unicast PDSCH transmissions and a relatively long PUCCH may be required for UL coverage for feedback to multicast.

Embodiments of the present disclosure provide solutions to solve the above issues. For example, solutions for leveraging the HARQ-ACK feedback of a group of UEs receiving a multicast transmission on different or the same slot or sub-slot are proposed. In some embodiments of the present disclosure, the concept of sub-slot is introduced to overcome the limitation that some UEs may not be able to transmit more than one PUCCH with HARQ-ACK information in a slot, especially for the ultra-reliable low-latency communication (URLLC) services with stringent requirements. When sub-slot is supported, one slot can have multiple sub-slots with each sub-slot having the same number of symbols (e.g., 2 symbols).

More details on the embodiments of the present disclosure will be illustrated in the following text in combination with the appended drawings.

In some embodiments of the present disclosure, for a group of UEs receiving multicast service from a BS, each UE may be configured with a specific PUCCH(s) resource for the UE to transmit corresponding HARQ-ACK feedback (e.g., ACK or NACK) to the BS. In some embodiments of the present disclosure, each UE of the group of UEs may be configured with two PUCCH resources, one for transmitting am ACK and another for transmitting a NACK. In some embodiments of the present disclosure, each UE of the group of UEs may be configured with one PUCCH resource for transmitting a NACK.

To leverage the PUCCH overhead in one slot or sub-slot, the group of UEs may be divided into one or more sub-groups of UEs. Various methods can be applied to the sub-grouping of the group of UEs.

For example, in some embodiments of the present disclosure, the sub-grouping may be based on the locations of the UEs. For instance, UEs in the same geographic area may be divided into the same sub-group. In some embodiments of the present disclosure, the sub-grouping may be based on UE capability. For example, UEs which support PTP based retransmission may be divided into the same sub-group, while UEs which do not support PTP based retransmission may belong to another sub-group. In some embodiments of the present disclosure, the sub-grouping may be based on the transmit (Tx) beam of a BS associated with the group of UEs (e.g., the serving BS of the group of UEs). For example, UEs which are served with the same Tx beam may be divided into the same sub-group, while UEs which are served with different Tx beams may belong to different sub-groups. In this example, the number of sub-groups of the UEs may equal to the number of Tx beams of the BS.

Each sub-group of UEs may be assigned a corresponding sub-group index. In some examples, radio resource control (RRC) signaling may be used to configure the corresponding sub-group index to each UE in the group of UEs. The same sub-group index should be configured to UEs belonging to the same sub-group of UEs. Different sub-group indices should be configured to UEs belonging to different sub-groups of UEs. The sub-group index thus can identify a sub-group of UEs from the one or more sub-groups of UEs.

UEs in the same sub-groups of UEs may transmit corresponding HARQ-ACK feedback in the same slot (or sub-slot when sub-slot based PUCCH is supported). UEs in different sub-groups of UEs may transmit corresponding HARQ-ACK feedback in different slots (or sub-slots when sub-slot based PUCCH is supported). The specific slot or sub-slot for each sub-group of UEs transmitting the HARQ-ACK feedback may be determined based on the DCI format (e.g., the PDSCH-to-HARQ_feedback timing field in the group-common DCI) and the sub-group index. In some examples, the specific slot or sub-slot for each sub-group of UEs transmitting the HARQ-ACK feedback may be determined based on a combination of a slot where the PDSCH is received, the PDSCH-to-HARQ timing value indicated by the DCI format, and the sub-group index.

For example, assuming that the timing value indicated by the PDSCH-to-HARQ_feedback timing field in the group-common DCI is k and the group-common PDSCH is received in slot n, a UE can determine that the HARQ-ACK feedback corresponding to the PDSCH is to be transmitted in slot n+k+i, where i refers to the sub-group index configured to the UE.

Each UE in a sub-group of UEs may be configured with a specific PUCCH resource for transmitting corresponding HARQ-ACK feedback. In response to the reception of a PDSCH (e.g., group-common PDSCH) scheduled by a DCI format (e.g., the group-common DCI), when HARQ-ACK feedback is enabled, for each sub-group of UEs, all the UEs in the same sub-group of UEs may transmit the HARQ-ACK feedback in the same slot or the same sub-slot on the configured PUCCH resources.

The number of sub-groups of UEs may be determined based on the number of UEs in the group of UEs and the PUCCH resources reserved for the group of UEs. or vice versa. For example, in some embodiments of the present disclosure, when two PUCCH resources are configured to each member UE for respectively transmitting an ACK and a NACK, the number of sub-groups of UEs may be determined according to $$\left\lceil \frac{N}{2M} \right\rceil;$$

or when one PUCCH resource is configured to each member UE for transmitting a NACK, the number of sub-groups of UEs may be determined according to $$\left\lceil \frac{N}{M} \right\rceil,$$

where N denotes the number of UEs in the group of UEs and M denotes the number of PUCCH resources reserved for the group of UEs in one slot in case that only slot-based PUCCH is supported or M denotes the number of PUCCH resources reserved for the group of UEs in one sub-slot in case that the sub-slot based PUCCH is supported. Accordingly, the same PUCCH resource(s) can be utilized for different sub-groups in different slots or sub-slots. In other words, N UEs can utilize M PUCCH resources in $$\left\lceil \frac{N}{2M} \right\rceil$$

slots or sub-slots or $$\left\lceil \frac{N}{M} \right\rceil$$

slots or sub-slots. UE-specific HARQ-ACK feedback can be achieved.

In this way, UEs in different sub-groups would transmit the HARQ-ACK feedback in different slots or sub-slots. Consequently, the PUCCH resource overhead can be leveraged to one or more slots or sub-slots so as to alleviate the PUCCH resource limitation issue.

Figure 2:
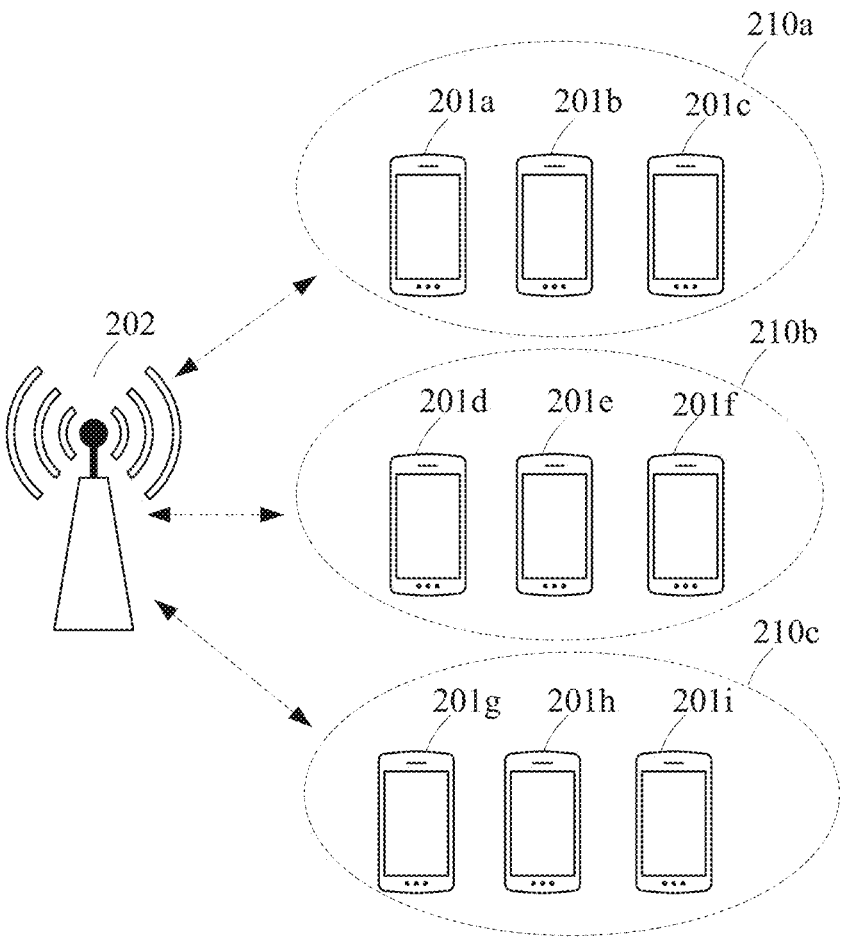
FIG. 2 illustrates an example of subgroups of UEs in accordance with some embodiments of the present disclosure.
Figure 3:
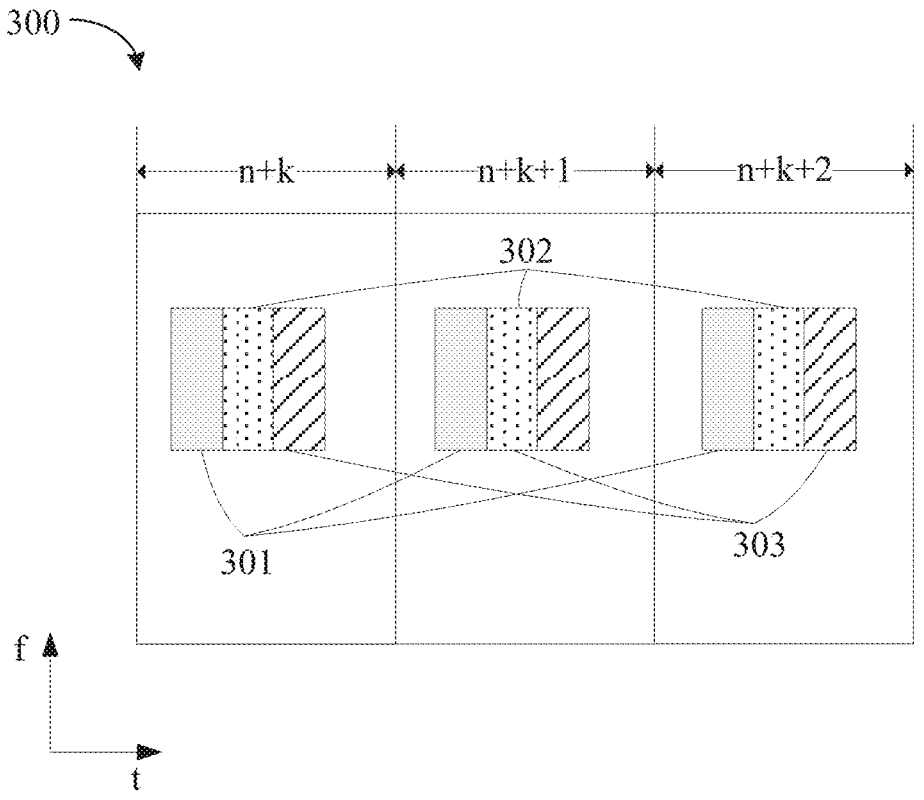
FIG. 3 illustrates an example of a resource allocation scheme for HARQ-ACK feedback transmission in accordance with some embodiments of the present disclosure.

FIG. 2 illustrates an example of subgroups of UEs in accordance with some embodiments of the present disclosure. FIG. 3 illustrates an example of a resource allocation scheme 300 for HARQ-ACK feedback transmission in accordance with some embodiments of the present disclosure. The PUCCH resource configuration shown in FIG. 3 is intended to be illustrative, not limiting. For example, PUCCH resources 301 and 302 may have different starting points and sizes in the frequency domain, and may have different or the same starting points and sizes in the time domain.

Referring to FIG. 2, UEs 201a-201i may receive multicast service (e.g., a PDSCH) from BS 202. For example, UEs 201a-201i may function as UE 101a or UE 101b in FIG. 1 and BS 202 may function as BS 102 in FIG. 1. BS 202 may allocate one or more PUCCH resources for UEs 201a-201i transmitting HARQ-ACK feedback for the PDSCH. For example, referring to FIG. 3, PUCCH resources 301-303 may be reserved for UEs 201a-201i transmitting HARQ-ACK feedback (e.g., NACK) for the PDSCH.

Referring back to FIG. 2, BS 202 may divide UEs 201a-201i into one or more sub-groups of UEs according to various methods (e.g., the locations of the UEs). For example, BS 202 may divide UEs 201a-201i into three $$\left(\text{i.e., } \left\lceil \frac{N}{M} \right\rceil = 3\right)$$

sub-groups of UEs, including sub-group 210a, sub-group 210b, and sub-group 210c. Sub-group 210b may include UEs 201a-201c, sub-group 210b may include UEs 201d-201f, and sub-group 210c may include UEs 201g-201i. BS 202 may assign respective sub-group indices to the sub-groups of UEs. For example, sub-group 210a, sub-group 210b, and sub-group 210c may have a sub-group index of 0, 1 and 2, respectively. BS 202 may configure sub-group index "0" to UEs 201a-201c, sub-group index "1" to UEs 201d-201f, sub-group index "2" to UEs 201g-201i.

For each UE in a sub-group of UEs, BS 202 may configure a specific PUCCH resource for transmitting corresponding HARQ-ACK feedback. For example, referring to FIG. 3, UEs 201a-201c in sub-group 210a may be configured with PUCCH resources 301-303, respectively; UEs 201d-201f in sub-group 210b may be configured with PUCCH resources 301-303, respectively; and UEs 201g-201i in sub-group 210c may be configured with PUCCH resources 301-303, respectively.

Referring back to FIG. 2, assuming that BS 202 transmits a DCI format scheduling a PDCSH to UEs 201a-201i and transmits the PDCSH to UEs 201a-201i in slot n, UEs 201a-201i may determine a time domain resource for transmitting corresponding HARQ-ACK feedback based on the DCI format and the configured sub-group index. For example, assuming that the PDSCH-to-HARQ_feedback timing field in the DCI format indicates a timing value of k, UEs 201a-201c in sub-group 210a may transmit HARQ-ACK feedback in slot n+k, UEs 201d-201f in sub-group 210b may transmit HARQ-ACK feedback in slot n+k+1, and UEs 201g-201i in sub-group 210c may transmit HARQ-ACK feedback in slot n+k+2. Referring to FIG. 3, UE 201a may transmit HARQ-ACK feedback on PUCCH resource 301 in slot n+k, UE 201b may transmit HARQ-ACK feedback on PUCCH resource 302 in slot n+k, and UE 201c may transmit HARQ-ACK feedback on PUCCH resource 303 in slot n+k. Similarly, UEs 201d-201f may respectively transmit HARQ-ACK feedback on PUCCH resources 301-303 in slot n+k+1, and UEs 201g-201i may respectively transmit HARQ-ACK feedback on PUCCH resources 301-303 in slot n+k+2.

In some embodiments of the present disclosure, the sub-grouping may be realized only at the BS side, and may be transparent to the group of UEs receiving multicast service from the BS.

For the group of UEs receiving multicast service from a BS, each UE may be configured with a specific PUCCH resource(s) for the UE to transmit corresponding HARQ-ACK feedback (e.g., ACK or NACK) to the BS. In some embodiments of the present disclosure, each UE of the group of UEs may be configured with two PUCCH resources, one for transmitting an ACK and another for transmitting a NACK. In some embodiments of the present disclosure, each UE of the group of UEs may be configured with one PUCCH resource for transmitting a NACK.

To leverage the PUCCH overhead in one slot or sub-slot, the group of UEs may be divided into one or more sub-groups of UEs. Various methods, including the one or more mentioned above, can be applied to the sub-grouping of the group of UEs. The sub-grouping is realized only at the BS side and is transparent to the group of UEs. In other words, UEs of the group of UEs are not aware of the sub-grouping.

Each sub-group of UEs may have a specific set of HARQ-ACK feedback timing values (e.g., configured by a higher layer parameter such as dl-DataTotJL-ACK), which is hereinafter referred to as "K1 set" for simplicity. Radio resource control (RRC) signaling may be used to configure the corresponding K1 set to each UE in the group of UEs. The same K1 set should be configured to UEs belonging to the same sub-group of UEs. Different K1 sets should be configured to UEs belonging to different sub-groups of UEs. The sub-group index thus can identify a sub-group of UEs from the one or more sub-groups of UEs.

The configuration of K1 sets should enable UEs in different sub-groups of UEs to transmit HARQ-ACK feedback in different slots (or different sub-slots when a sub-slot based PUCCH is supported). In addition, the configuration of K1 sets should also guarantee that the total number of PUCCH resources required in one slot (or one sub-slot when a sub-slot based PUCCH is supported) does not exceed the maximum number of PUCCH resources reserved for the multicast service, so as to leverage the PUCCH overhead in one slot or sub-slot.

The specific slot or sub-slot for each sub-group of UEs transmitting HARQ-ACK feedback may be determined based on the DCI format (e.g., the PDSCH-to-HARQ_feedback timing field in the group-common DCI) and the sub-group specific K1 set. In some examples, assuming that the timing value indicated by the PDSCH-to-HARQ_feedback timing field in the group-common DCI is k and the group-common PDSCH is received in slot n, a member UE can determine that the HARQ-ACK feedback corresponding to the PDSCH is to be transmitted in slot $n+x_0$, where the value of x is the $k^{th}$ value in the associated K1 set (i.e., the K1 set configured to the UE by the BS).

For example, UEs in sub-group 0 may transmit HARQ-ACK feedback in slot $n+x_0$, where the value of $x_0$ is the $k^{th}$ value in the associated K1 set of sub-group 0; UEs in sub-group 1 may transmit HARQ-ACK feedback in slot $n+x_1$, where the value of $x_1$ is the $k^{th}$ value in the associated K1 set of sub-group 1; UEs in sub-group 2 may transmit HARQ-ACK feedback in slot $n+x_2$, where the value of $x_2$ is the $k^{th}$ value in the associated K1 set of sub-group 2; and so on.

Each UE in a sub-group of UEs may be configured with a specific PUCCH resource for transmitting corresponding HARQ-ACK feedback. In response to the reception of a PDSCH (e.g., group-common PDSCH) scheduled by a DCI format (e.g., the group-common DCI), when HARQ-ACK feedback is enabled, for each sub-group of UEs, all the UEs in the same sub-group of UEs may transmit the HARQ-ACK feedback in the same slot or the same sub-slot on the configured PUCCH resources.

The number of sub-groups of UEs may be determined based on the number of UEs in the group of UEs and the PUCCH resources reserved for the group of UEs or vice versa. In some embodiments of the present disclosure, when two PUCCH resources are configured to each member UE for respectively transmitting an ACK and a NACK, the number of sub-groups of UEs may be determined according to $$\left\lceil \frac{N}{2M} \right\rceil$$

or when one PUCCH resource is configured to each member UE for transmitting a NACK, the number of sub-groups of UEs may be determined according to $$\left\lceil \frac{N}{M} \right\rceil,$$

where N denotes the number of UEs in the group of UEs and M denotes the number of PUCCH resources reserved for the group of UEs in one slot in case that only slot-based PUCCH is supported or M denotes the number of PUCCH resources reserved for the group of UEs in one sub-slot in case that sub-slot based PUCCH is supported. Accordingly, the same PUCCH resource(s) can be utilized for different sub-groups in different slots or sub-slots. In other words, N UEs can utilize M PUCCH resources in $$\left\lceil \frac{N}{2M} \right\rceil$$

slots or sub-slots or $$\left\lceil \frac{N}{M} \right\rceil$$

slots or sub-slots. UE-specific HARQ-ACK feedback can be achieved.

In this way, UEs in different sub-groups would transmit the HARQ-ACK feedback in different slots or sub-slots. Consequently, the PUCCH resource overhead can be leveraged to one or more slots or sub-slots so as to alleviate the PUCCH resource limitation issue.

Referring again to FIG. 2, according to the above embodiments, the sub-grouping of UEs 201a-201i may be performed transparently to these UEs. For example, BS 202 may divide UEs 201a-201i into sub-group 210a, sub-group 210b, and sub-group 210c. However, in these embodiments, BS 202 may not configure sub-group indices to the three sub-groups of UEs. Instead, BS 202 may configure respective K1 sets to the three sub-groups of UEs. For example, BS 202 may configure a K1 set of {1,2,3,4,5,6,7,8} (hereinafter, "K1$_0$") to UEs in sub-group 210a, a K1 set of {2,3,4,5,6,7,8,1} (hereinafter, "K1$_1$") to UEs in sub-group 210b, and a K1 set of {3,4,5,6,7,8,1,2,} to UEs in sub-group 210c (hereinafter, "K1$_2$").

Assuming that BS 202 transmits a DCI format scheduling a PDCSH to UEs 201a-201i and transmits the PDCSH to UEs 201a-201i in slot n, UEs 201a-201i may determine a time domain resource for transmitting corresponding HARQ-ACK feedback based on the DCI format and corresponding K1 sets. For example, assuming that the PDSCH-to-HARQ_feedback timing field in the DCI format indicates 4, UEs 201a-201c in sub-group 210a may transmit HARQ-ACK feedback on the configured PUCCH resources (e.g., PUCCH resources 301-303 in FIG. 3) in slot n+4 since the $4^{th}$ value in $K1_0$ is 4. UEs 201d-201f in sub-group 210b may transmit HARQ-ACK feedback on the configured PUCCH resources (e.g., PUCCH resources 301-303 in FIG. 3) in slot n+5 since the $4^{th}$ value in $K1_1$ is 5, and UEs 201g-201i in sub-group 210c may transmit HARQ-ACK feedback on the configured PUCCH resources (e.g., PUCCH resources 301-303 in FIG. 3) in slot n+6 since the $4^{th}$ value in $K1_2$ is 6.

In some embodiments of the present disclosure, the HARQ-ACK feedback for a group of UEs receiving multicast service from a BS may be transmitted on the same slot or sub-slot.

The group of UEs may be divided into one or more sub-groups of UEs. Various methods, including the one or more mentioned above, can be applied to the sub-grouping of the group of UEs.

Different PUCCH resources may be configured for different sub-groups of UEs. The PUCCH resource may be dedicated for a sub-group of UEs. In other words, the PUCCH resource may be sub-group specific. UEs in the same sub-group of UEs may share the same PUCCH resource(s) and UEs in different sub-groups of UEs may be configured with different PUCCH resources.

For example, in some embodiments of the present disclosure, each UE of a sub-group of UEs may be configured with two PUCCH resources for transmitting HARQ-ACK feedback, i.e., one for transmitting an ACK and another for transmitting a NACK. The two PUCCH resources are shared among all UEs in the sub-group of UEs. Different PUCCH resources may be configured for different sub-groups of UEs. When a PDSCH from a BS is successfully received by a UE, the UE may transmit ACK feedback to the BS in the sub-group specific PUCCH resource for an ACK transmission. When the PDSCH is not successfully received, the UE may transmit NACK feedback to the BS in the sub-group specific PUCCH resource for a NACK transmission.

Since each sub-group requires two PUCCH resources, the number of sub-groups of UEs may be determined based on the PUCCH resources reserved for the group of UEs or vice versa. For example, the number of sub-groups of UEs may be equal to 2/M where M denotes the number of PUCCH resources reserved for the group of UEs in one slot in case that only slot-based PUCCH is supported, or M denotes the number of PUCCH resources reserved for the group of UEs in one sub-slot in case that sub-slot based PUCCH is supported. M is an even number.

In some embodiments of the present disclosure, each UE of a sub-group of UEs may be configured with one PUCCH resource for transmitting HARQ-ACK feedback, i.e., NACK. This single PUCCH resource is shared among all UEs in the sub-group of UEs. Different PUCCH resources may be configured for different sub-groups of UEs. When a PDSCH from a BS is successfully received by a UE, the UE does not transmit ACK feedback to the BS. When the PDSCH is not successfully received, the UE may transmit NACK feedback to the BS in the sub-group specific PUCCH resource for a NACK transmission.

Since each sub-group requires a single PUCCH resources, the number of sub-groups of UEs may be determined based on the PUCCH resources reserved for the group of UEs or vice versa. For example, the number of sub-groups of UEs may be equal to M, where M denotes the number of PUCCH resources reserved for the group of UEs in one slot in case that only slot-based PUCCH is supported, or M denotes the number of PUCCH resources reserved for the group of UEs in one sub-slot in case that the sub-slot based PUCCH is supported.

Based on the sub-group specific PUCCH resource, the BS can identify which sub-group has not successfully decoded the PDSCH. The BS may perform a retransmission according to the PTP transmission scheme to all the UEs in the identified sub-group.

In some embodiments of the present disclosure, the BS may perform a sub-group based PTM retransmission to all the UEs in the identified sub-group. For example, in addition to the group-common RNTI (e.g., G-RNTI in PTM transmission scheme 1) for scrambling both the CRC of the group-common DCI and codeword of the group-common PDSCH, a sub-group common RNTI (e.g., sub-group RNTI (SG-RNTI)) may be configured via, for example, RRC signaling, to UEs in the same sub-group of UEs. That is. UEs within the same sub-group of UEs share the same sub-group common RNTI (e.g., SG-RNTI). In this way, sub-group based PTM transmission and retransmission can be supported. For example, in response to determining which sub-group has not successfully decoded the PDSCH, the BS may perform a retransmission according to sub-group based PTM transmission scheme 1 to all the UEs in the determined sub-group.

Sub-group based PTM transmission scheme 1 can be deemed as an extension of PTM transmission scheme 1 and uses the sub-group specific RNTI in place of the group-common RNTI. For example, to implement the sub-group based retransmission via PTM transmission scheme 1, UEs in a sub-group of UEs may monitor the DCI format with the CRC scrambled by the C-RNTI for PTP transmission or retransmission, the DCI format with the CRC scrambled by the G-RNTI for group-based PTM transmission or retransmission, and the DCI format with the CRC scrambled by the SG-RNTI for sub-group based transmission or retransmission.

As mentioned above, in the above embodiments of the present disclosure, UEs in different sub-groups may transmit HARQ-ACK feedback in the same sub-slots or slots. The specific slot or sub-slot for the group of UEs transmitting the HARQ-ACK feedback may be determined based on the DCI format (e.g., the PDSCH-to-HARQ_feedback timing field in the group-common DCI). For example, assuming that the timing value indicated by the PDSCH-to-HARQ_feedback timing field in the group-common DCI is k and the group-common PDSCH is received in slot n, a member UE can determine that the HARQ-ACK feedback corresponding to the PDSCH is to be transmitted in slot n+k.

In response to the reception of the group-common PDSCH scheduled by the group-common DCI, when HARQ-ACK feedback is enabled, all UEs in a sub-group of UEs may transmit the HARQ-ACK feedback in the same slot or the same sub-slot on the same PUCCH resource(s) configured for the sub-group of UEs, and all UEs in the groups of UEs may transmit the HARQ-ACK feedback in the same slot or the same sub-slot on the PUCCH resources configured for the one or more sub-groups of UEs.

In this way, since all UEs in a sub-group of UEs share the PUCCH resource(s), the PUCCH resource overhead is quite low so as to alleviate the PUCCH resource limitation issue.

Figure 4:
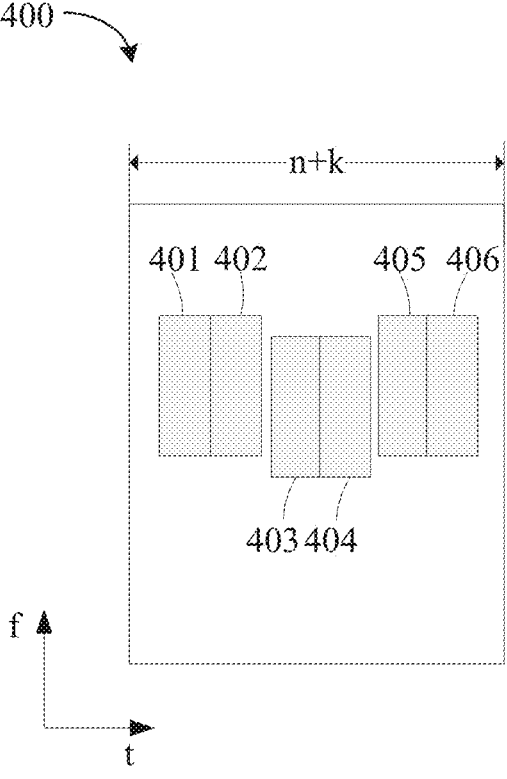
FIG. 4 illustrates an example of a resource allocation scheme for HARQ-ACK feedback transmission in accordance with some embodiments of the present disclosure.

Referring again to FIG. 2, according to the above embodiments, for each of sub-groups 210a-210c, two PUCCH resources may be configured for HARQ-ACK feedback (e.g., ACK and NACK) transmission and shared among the UEs in a corresponding sub-group. For example, FIG. 4 illustrates an example of a resource allocation scheme 400 for HARQ-ACK feedback transmission in accordance with some embodiments of the present disclosure. Referring to FIG. 4, UEs 201a-201c in sub-group 210a may be configured with PUCCH resources 401 and 402 for transmitting an ACK and a NACK, respectively; UEs 201d-201f in sub-group 210b may be configured with PUCCH resources 403 and 404 for transmitting an ACK and a NACK, respectively; and UEs 201g-201i in sub-group 210c may be configured with PUCCH resources 405 and 406 for transmitting an ACK and a NACK, respectively. The PUCCH resource configuration shown in FIG. 4 is intended to be illustrative, not limiting.

Referring back to FIG. 2, assuming that BS 202 transmits a DCI format scheduling a PDCSH to UEs 201a-201i and transmits the PDCSH to UEs 201a-201i in slot n, UEs 201a-201i may determine a time domain resource for transmitting corresponding HARQ-ACK feedback based on the DCI format. For example, assuming that the timing value indicated by the PDSCH-to-HARQ_feedback timing field in the DCI format is k, UEs 201a-201i can determine that the HARQ-ACK feedback corresponding to the PDSCH is to be transmitted in slot n+k on the configured PUCCH resources.

For example, referring to FIG. 4, UEs 201a-201c in sub-group 210a may transmit HARQ-ACK feedback on PUCCH resources 401 and 402 in slot n+k, UEs 201d-201f in sub-group 210b may transmit HARQ-ACK feedback on PUCCH resources 403 and 404 in slot n+k. UEs 201g-201i in sub-group 210c may transmit HARQ-ACK feedback on PUCCH resources 405 and 406 in slot n+k.

Referring back to FIG. 2, based on the sub-group specific PUCCH resources, BS 202 can identify which sub-group has not successfully decoded the PDSCH. For example, when BS 202 detects a NACK in the resource (e.g., PUCCH resource 402) specifically configured for sub-group 210a and ACKs in the resources (e.g., PUCCH resources 403 and 405) specifically configured for both sub-group 210b and sub-group 210c, BS 202 can perform a retransmission only to sub-group 210a by scrambling the CRC of the group-common DCI by a SG-RNTI configured for sub-group 210a.

In some embodiments of the present disclosure, the sub-group common RNTI (e.g., SG-RNTI) may not be configured. A sub-group specific PUCCH resource(s) may be configured to each of the one or more sub-groups of UEs to alleviate or avoid signal interference. For example, each of the one or more sub-groups of UEs may be configured with a corresponding PUCCH resource for transmitting NACK feedback to the BS. Based on the sub-group specific PUCCH resource, the BS can identify which sub-group of UEs has not successfully decoded the PDSCH. The BS may perform a retransmission according to the PTP transmission scheme to all the UEs in the identified sub-group of UEs.

Figure 5:
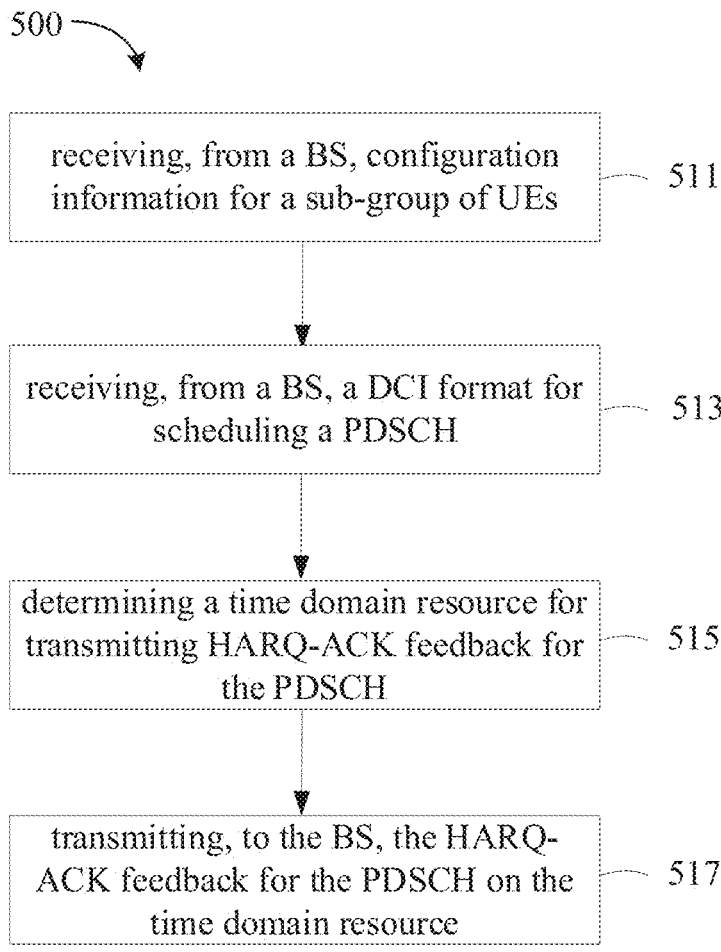
FIG. 5 illustrates a flow chart of an exemplary procedure of wireless communications in accordance with some embodiments of the present disclosure.

FIG. 5 illustrates a flow chart of an exemplary procedure 500 for wireless communications in accordance with some embodiments of the present disclosure. Details described in all of the foregoing embodiments of the present disclosure are applicable for the embodiments shown in FIG. 5. In some examples, the procedure may be performed by a UE, for example, UE 101 in FIG. 1 or UEs 201a-201i in FIG. 2.

Referring to FIG. 5, in operation 511, a UE may receive, from a BS, configuration information for a sub-group of UEs. The sub-group of UEs includes the UE. The configuration information may be configured via an RRC signaling message.

In operation 513, the UE may receive, from a BS, a DCI format for scheduling a PDSCH. The PDSCH may be received by a plurality of UEs which are divided into a plurality of sub-groups of UEs comprising the sub-group of UEs. The plurality of UEs may receive a multicast service from the BS. The plurality of UEs may be divided into the plurality of sub-groups of UEs based on one or more of the following: geographic locations of the plurality of UEs; UE capabilities; and transmit beams of the BS associated with the plurality of UEs.

In operation 515, the UE may determine a time domain resource for transmitting HARQ-ACK feedback for the PDSCH. In operation 517, the UE may transmit, to the BS, the HARQ-ACK feedback for the PDSCH on the time domain resource. The HARQ-ACK feedback of the plurality of UEs may be transmitted on different slots or sub-slots or the same slot or sub-slot.

In some embodiments of the present disclosure, the configuration information may include a sub-group index for the sub-group of UEs. The sub-group index can identify the sub-group of UEs from the plurality of sub-groups of UEs. For example, the sub-group index is specifically configured for the sub-group of UEs. The time domain resource for transmitting the HARQ-ACK feedback may be determined based on the DCI format and the sub-group index. For example, the time domain resource may be determined based on a combination of a slot where the PDSCH is received, a PDSCH-to-HARQ timing value indicated by the DCI format, and the sub-group index.

In some embodiments of the present disclosure, the configuration information may include a set of HARQ-ACK feedback timing values for the sub-group of UEs (e.g., K1 set). Each of the plurality of sub-groups of UEs may be configured with an associated set of HARQ-ACK feedback timing values. In some examples, a plurality of sets of HARQ-ACK feedback timing values are configured for the plurality of sub-groups of UEs and can enable UEs in different sub-groups of UEs to transmit corresponding HARQ-ACK feedback in different slots or sub-slots. The time domain resource for transmitting the HARQ-ACK feedback may be determined based on the DCI format and the set of HARQ-ACK feedback timing values.

In the above embodiments of the present disclosure, each UE in the sub-group of UEs may be configured with a specific PUCCH resource for transmitting corresponding HARQ-ACK feedback. The number of sub-groups of UEs of the plurality of sub-groups of UEs may be determined based on the number of UEs of the plurality of UEs and the number of PUCCH resources for the PDSCH.

In some embodiments of the present disclosure, the configuration information may include an RNTI for the sub-group of UEs (e.g., SG-RNTI). Transmitting the HARQ-ACK feedback for the PDSCH on the time domain resource may include transmitting the HARQ-ACK feedback for the PDSCH on a PUCCH resource shared among UEs in the sub-group of UEs in the time domain resource. Different PUCCH resources may be configured for different sub-groups of UEs of the plurality of sub-groups of UEs. For example, the PUCCH resource may be dedicated for the sub-group of UEs.

In some examples, each UE in the sub-group of UEs may be configured with two PUCCH resources for transmitting an ACK and a NACK, respectively. All UEs in the sub-group of UEs may share the two PUCCH resources. The number of sub-groups of UEs of the plurality of sub-groups of UEs may be equal to half of the number of PUCCH resources for the PDSCH.

In some examples, each UE in the sub-group of UEs may be configured with a single PUCCH resource for transmitting a NACK. All UEs in the sub-group of UEs may share the single PUCCH resource. The number of sub-groups of UEs of the plurality of sub-groups of UEs may be equal to the number of PUCCH resources for the PDSCH.

When the PDSCH is not successfully received, the UE may transmit NACK feedback to the BS on the determined time domain resource. In some embodiments of the present disclosure, the UE may receive another DCI format (hereinafter, "first DCI format") with a CRC scrambled by the RNTI for the sub-group of UEs. The first DCI format may schedule a retransmission of the PDSCH. The UE may transmit HARQ-ACK feedback corresponding to the retransmission of the PDSCH. The retransmission may be a sub-group based PTM retransmission. In some other embodiments of the present disclosure, the sub-group common RNTI may not be configured, and the retransmission may be performed according to the PTP transmission scheme to all the UEs in the sub-group of UEs including the UE.

In some embodiments of the present disclosure, the configuration information may include a PUCCH resource for the sub-group of UEs for transmitting a NACK corresponding to the PDSCH. The PUCCH resource may be specifically configured for the sub-group of UEs. By dividing the plurality of UEs into a plurality of sub-groups of UEs, each of which is configured with a sub-group specific PUCCH resource, signal interference may be alleviated or avoided.

It should be appreciated by persons skilled in the art that the sequence of the operations in exemplary procedure 500 may be changed and some of the operations in exemplary procedure 500 may be eliminated or modified, without departing from the spirit and scope of the disclosure.

Figure 6:
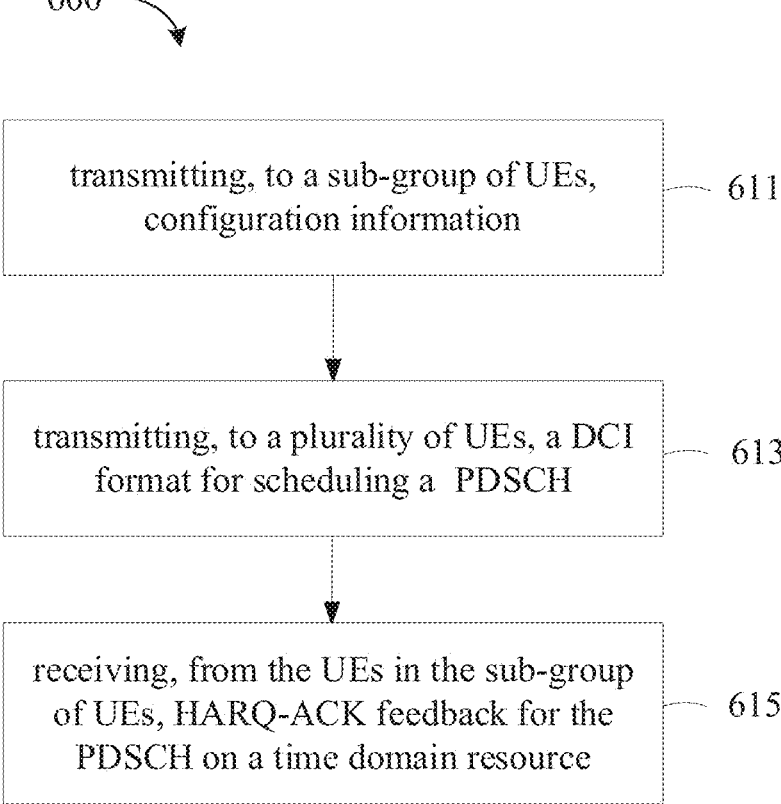
FIG. 6 illustrates a flow chart of an exemplary procedure of wireless communications in accordance with some embodiments of the present disclosure.

FIG. 6 illustrates a flow chart of an exemplary procedure 600 for wireless communications in accordance with some embodiments of the present disclosure. Details described in all of the foregoing embodiments of the present disclosure are applicable for the embodiments shown in FIG. 6. In some examples, the procedure may be performed by a BS, for example, BS 102 in FIG. 1 or BS 202 in FIG. 2.

Referring to FIG. 6, in operation 611, a BS may transmit, to a sub-group of UEs configuration information.

In operation 613, the BS may transmit, to a plurality of UEs, a DCI format for scheduling a PDSCH. The plurality of UEs may be divided into a plurality of sub-groups of UEs, which includes the sub-group of UEs. The BS may divide the plurality of UEs into the plurality of sub-groups of UEs based on one or more of the following: geographic locations of the plurality of UEs; UE capabilities; and transmit beams of the BS associated with the plurality of UEs.

In operation 615, the BS may receive, from the UEs in the sub-group of UEs, HARQ-ACK feedback for the PDSCH on a time domain resource.

In some embodiments of the present disclosure, the configuration information may include a sub-group index for the sub-group of UEs. The sub-group index can identify the sub-group of UEs from the plurality of sub-groups of UEs. For example, the sub-group index is specifically configured for the sub-group of UEs. The time domain resource for transmitting the HARQ-ACK feedback may be determined based on the DCI format and the sub-group index. For example, the time domain resource may be determined based on a combination of a slot where the PDSCH is received, a PDSCH-to-HARQ timing value indicated by the DCI format, and the sub-group index.

In some embodiments of the present disclosure, the configuration information may include a set of HARQ-ACK feedback timing values for the sub-group of UEs (e.g., K1 set). The BS may configure each of the plurality of sub-groups of UEs with an associated set of HARQ-ACK feedback timing values. A plurality of sets of HARQ-ACK feedback timing values may be configured for the plurality of sub-groups of UEs and can enable UEs in different sub-groups of UEs to transmit corresponding HARQ-ACK feedback in different slots or sub-slots. The time domain resource for transmitting the HARQ-ACK feedback may be determined based on the DCI format and the set of HARQ-ACK feedback timing values.

In the above embodiments of the present disclosure, for each UE in the sub-group of UEs, the BS may configure a specific PUCCH resource for transmitting corresponding HARQ-ACK feedback. The BS may determine the number of sub-groups of UEs of the plurality of sub-groups of UEs based on the number of UEs of the plurality of UEs and the number of PUCCH resources for the PDSCH. Or the BS may determine the number of PUCCH resources for the PDSCH based on the number of UEs of the plurality of UEs and the number of sub-groups of UEs of the plurality of sub-groups of UEs.

In some embodiments of the present disclosure, the configuration information may include an RNTI for the sub-group of UEs (e.g., SG-RNTI). Receiving HARQ-ACK feedback for the PDSCH on the time domain resource may include receiving the HARQ-ACK feedback for the PDSCH on a PUCCH resource shared among UEs in the sub-group of UEs in the time domain resource. The BS may configure different PUCCH resources to different sub-groups of UEs of the plurality of sub-groups of UEs. For example, the PUCCH resource may be dedicated for the sub-group of UEs. In other words, UEs in the same sub-group of UEs may be configured with the same PUCCH resource(s), while UEs in different sub-group of UEs may be configured with different PUCCH resources.

In some examples, for each UE in the sub-group of UEs, the BS may configure two PUCCH resources for transmitting an ACK and a NACK, respectively. All UEs in the sub-group of UEs may share the two PUCCH resources. The number of sub-groups of UEs of the plurality of sub-groups of UEs may be equal to half of the number of PUCCH resources for the PDSCH.

In some examples, for each UE in the sub-group of UEs, the BS may configure a single PUCCH resource for transmitting a NACK. All UEs in the sub-group of UEs may share the single PUCCH resource. The number of sub-groups of UEs of the plurality of sub-groups of UEs may be equal to the number of PUCCH resources for the PDSCH.

When the PDSCH is not successfully received, the UE may transmit NACK feedback to the BS on the configured PUCCH in the determined time domain resource. In some embodiments of the present disclosure, the BS may transmit another DCI format (hereinafter, "first DCI format") with a CRC scrambled by the RNTI for the sub-group of UEs. The first DCI format may schedule a retransmission of the PDSCH. The BS may receive HARQ-ACK feedback corresponding to the retransmission of the PDSCH. The retransmission may be a sub-group based PTM retransmission. In some other embodiments of the present disclosure, the sub-group common RNTI may not be configured, and the retransmission may be performed according to the PTP transmission scheme to all the UEs in the sub-group of UEs including the UE.

In some embodiments of the present disclosure, the configuration information may include a PUCCH resource for the sub-group of UEs for transmitting a NACK corresponding to the PDSCH. The PUCCH resource may be specifically configured for the sub-group of UEs. By dividing the plurality of UEs into a plurality of sub-groups of UEs, each of which is configured with a sub-group specific PUCCH resource, signal interference may be alleviated or avoided.

It should be appreciated by persons skilled in the art that the sequence of the operations in exemplary procedure 600 may be changed and some of the operations in exemplary procedure 600 may be eliminated or modified, without departing from the spirit and scope of the disclosure.

Figure 7:
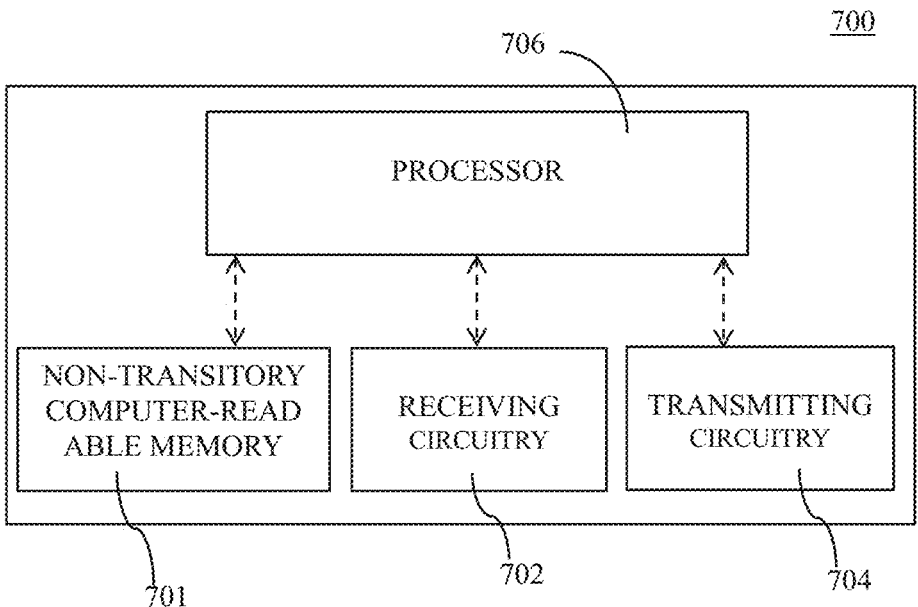
FIG. 7 illustrates a block diagram of an exemplary apparatus in accordance with some embodiments of the present disclosure.

FIG. 7 illustrates a block diagram of an exemplary apparatus 700 according to some embodiments of the present disclosure.

As shown in FIG. 7, the apparatus 700 may include at least one non-transitory computer-readable medium 701, at least one receiving circuitry 702, at least one transmitting circuitry 704, and at least one processor 706 coupled to the non-transitory computer-readable medium 701, the receiving circuitry 702 and the transmitting circuitry 704. The apparatus 700 may be a base station side apparatus (e.g., a BS) or a communication device (e.g., a UE).

Although in this figure, elements such as the at least one processor 706, transmitting circuitry 704, and receiving circuitry 702 are described in the singular, the plural is contemplated unless a limitation to the singular is explicitly stated. In some embodiments of the present application, the receiving circuitry 702 and the transmitting circuitry 704 are combined into a single device, such as a transceiver. In certain embodiments of the present application, the apparatus 700 may further include an input device, a memory, and/or other components.

In some embodiments of the present disclosure, the non-transitory computer-readable medium 701 may have stored thereon computer-executable instructions to cause a processor to implement the method with respect to the UEs as described above. For example, the computer-executable instructions, when executed, cause the processor 706 interacting with receiving circuitry 702 and transmitting circuitry 704, so as to perform the operations with respect to the UEs described in FIGS. 1-6.

In some embodiments of the present disclosure, the non-transitory computer-readable medium 701 may have stored thereon computer-executable instructions to cause a processor to implement the method with respect to the BSs as described above. For example, the computer-executable instructions, when executed, cause the processor 706 interacting with receiving circuitry 702 and transmitting circuitry 704, so as to perform the operations with respect to the BSs described in FIGS. 1-6.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including." Expressions such as "A and/or B" or "at least one of A and B" may include any and all combinations of words enumerated along with the expression. For instance, the expression "A and/or B" or "at least one of A and B" may include A. B, or both A and B. The wording "the first," "the second" or the like is only used to clearly illustrate the embodiments of the present application, but is not used to limit the substance of the present application.

What is claimed:

1. A method performed by a user equipment (UE), the method comprising:

receiving, from a base station (BS), configuration information for a sub-group of UEs, the sub-group of UEs including the UE, wherein the configuration information includes a sub-group index for the sub-group of UEs;

receiving, from the BS, a downlink control information (DCI) format for scheduling a physical downlink shared channel (PDSCH), the PDSCH being received by a plurality of UEs that are divided into a plurality of sub-groups of UEs comprising the sub-group of UEs;

determining a time domain resource for transmitting hybrid automatic repeat request acknowledgement (HARQ-ACK) feedback for the PDSCH based at least in part on the DCI format and the sub-group index; and transmitting, to the BS, the HARQ-ACK feedback for the PDSCH on the time domain resource.

2. A user equipment (UE) for wireless communication, comprising:

at least one memory; and at least one processor coupled with the at least one memory and configured to cause the UE to:

receive, from a base station (BS), configuration information for a sub-group of UEs, the sub-group of UEs including the UE, wherein the configuration information includes a sub-group index for the sub-group of UEs;

receive, from the BS, a downlink control information (DCI) format for scheduling a physical downlink shared channel (PDSCH), the PDSCH being received by a plurality of UEs that are divided into a plurality of sub-groups of UEs comprising the sub-group of UEs;

determine a time domain resource for transmitting hybrid automatic repeat request acknowledgement (HARQ-ACK) feedback for the PDSCH based at least in part on the DCI format and the sub-group index; and transmit, to the BS, the HARQ-ACK feedback for the PDSCH on the time domain resource.

3. The UE of claim 2, wherein the time domain resource is determined based on a combination of a slot where the PDSCH is received, a PDSCH-to-HARQ timing value indicated by the DCI format, and the sub-group index.

4. The UE of claim 2, wherein the configuration information further includes a set of HARQ-ACK feedback timing values for the sub-group of UEs, and wherein the time domain resource for transmitting the HARQ-ACK feedback is determined based at least in part on the set of HARQ-ACK feedback timing values.

5. The UE of claim 4, wherein a plurality of sets of HARQ-ACK feedback timing values configured for the plurality of sub-groups of UEs enables UEs in different sub-groups of UEs to transmit corresponding HARQ-ACK feedback in different slots or sub-slots.

6. The UE of claim 4, wherein each UE in the sub-group of UEs is configured with a specific physical uplink control channel (PUCCH) resource for transmitting corresponding HARQ-ACK feedback.

7. The UE of claim 4, wherein a number of sub-groups of UEs of the plurality of sub-groups of UEs is determined based at least in part on a number of UEs of the plurality of UEs and a number of PUCCH resources for the PDSCH.

8. The UE of claim 2, wherein the configuration information further includes a radio network temporary identifier (RNTI) for the sub-group of UEs, and wherein transmitting the HARQ-ACK feedback for the PDSCH on the time domain resource comprises transmitting the HARQ-ACK feedback for the PDSCH on a physical uplink control channel (PUCCH) resource shared among UEs in the sub-group of UEs in the time domain resource.

9. The UE of claim 8, wherein the at least one processor is configured to cause the UE to:

receive a first DCI format with a cyclic redundancy check (CRC) scrambled by the RNTI for the sub-group of UEs, wherein the first DCI format schedules retransmission of the PDSCH; and transmit HARQ-ACK feedback corresponding to the retransmission of the PDSCH.

10. The UE of claim 8, wherein different PUCCH resources are configured for different sub-groups of UEs of the plurality of sub-groups of UEs.

11. The UE of claim 8, wherein each UE in the sub-group of UEs is configured with two PUCCH resources for transmitting an acknowledgement (ACK) and a negative ACK (NACK), respectively; or wherein each UE in the sub-group of UEs is configured with a single PUCCH resource for transmitting a NACK.

12. The UE of claim 11, wherein all UEs in the sub-group of UEs share the two PUCCH resources or the single PUCCH resource.

13. The UE of claim 11, wherein a number of sub-groups of UEs of the plurality of sub-groups of UEs is equal to half of a number of PUCCH resources for the PDSCH or a number of PUCCH resources for the PDSCH.

14. The UE of claim 2, wherein the plurality of UEs are divided into the plurality of sub-groups of UEs based at least in part on one or more of:

geographic locations of the plurality of UEs;

UE capabilities; and transmit beams of the BS associated with the plurality of UEs.

15. The UE of claim 2, wherein the configuration information further includes a physical uplink control channel (PUCCH) resource for the sub-group of UEs for transmitting a negative acknowledgement (NACK) corresponding to the PDSCH.

16. A base station for wireless communication, comprising:

at least one memory; and at least one processor coupled with the at least one memory and configured to cause the base station to:

transmit, to a sub-group of user equipment (UE), configuration information, wherein the configuration information includes a sub-group index for the sub-group of UEs;

transmit, to a plurality of UEs, a downlink control information (DCI) format for scheduling a physical downlink shared channel (PDSCH), the plurality of UEs being divided into a plurality of sub-groups of UEs comprising the sub-group of UEs; and receive, from the UEs in the sub-group of UEs, hybrid automatic repeat request acknowledgement (HARQ-ACK) feedback for the PDSCH on a time domain resource, wherein the time domain resource is based at least in part on the DCI format and the sub-group index.

17. The base station of claim 16, wherein the configuration information further includes a set of HARQ-ACK feedback timing values for the sub-group of UEs.

18. The base station of claim 17, wherein each UE in the sub-group of UEs is configured with a specific physical uplink control channel (PUCCH) resource for transmitting corresponding HARQ-ACK feedback.

19. A method performed by a base station, the method comprising:

transmitting, to a sub-group of user equipment (UE), configuration information, wherein the configuration information includes a sub-group index for the sub-group of UEs;

transmitting, to a plurality of UEs, a downlink control information (DCI) format for scheduling a physical downlink shared channel (PDSCH), the plurality of UEs being divided into a plurality of sub-groups of UEs comprising the sub-group of UEs; and receiving, from the UEs in the sub-group of UEs, hybrid automatic repeat request acknowledgement (HARQ-ACK) feedback for the PDSCH on a time domain resource, wherein the time domain resource is based at least in part on the DCI format and the sub-group index.

* * * * *